(12) United States Patent
Buchan et al.

(10) Patent No.: US 11,465,909 B2
(45) Date of Patent: Oct. 11, 2022

(54) COMPOSITIONS OF PARTICULATE MATERIALS

(71) Applicant: Brand Pack (Pty) Ltd, Johannesburg (ZA)

(72) Inventors: Peter James Buchan, Johannesburg (ZA); Geordie Thain Mills, Johannesburg (ZA)

(73) Assignee: BRAND PACK (PTY) LTD, Johannesburg (ZA)

( * ) Notice: Subject to any disclaimer, the term of this patent is extended or adjusted under 35 U.S.C. 154(b) by 1053 days.

(21) Appl. No.: 16/084,191

(22) PCT Filed: Mar. 22, 2017

(86) PCT No.: PCT/IB2017/051659
§ 371 (c)(1),
(2) Date: Sep. 11, 2018

(87) PCT Pub. No.: WO2017/163199
PCT Pub. Date: Sep. 28, 2017

(65) Prior Publication Data
US 2020/0247683 A1    Aug. 6, 2020

(30) Foreign Application Priority Data

Mar. 22, 2016 (ZA) .................................. 2016/01944

(51) Int. Cl.
| | |
|---|---|
| C01F 17/271 | (2020.01) |
| C01B 33/12 | (2006.01) |
| C02F 1/52 | (2006.01) |
| C02F 1/68 | (2006.01) |
| C02F 103/42 | (2006.01) |

(52) U.S. Cl.
CPC ............ *C01F 17/271* (2020.01); *C01B 33/12* (2013.01); *C02F 1/52* (2013.01); *C02F 1/683* (2013.01); *C01P 2002/02* (2013.01); *C01P 2004/80* (2013.01); *C02F 2103/42* (2013.01)

(58) Field of Classification Search
CPC .......... C01F 17/271; C01B 33/12; C02F 1/52; C02F 1/683; C02F 2103/42; C02F 1/5245; C02F 1/56; C02F 2101/105; C01P 2002/02; C01P 2004/80; B01J 20/0207; B01J 20/0288; B01J 20/103; B01J 20/2803; B01J 20/3204; B01J 20/3234

See application file for complete search history.

(56) References Cited

U.S. PATENT DOCUMENTS

| | | |
|---|---|---|
| 2003/0156981 A1 | 8/2003 | Mills |
| 2014/0124454 A1 | 5/2014 | Nichols et al. |

FOREIGN PATENT DOCUMENTS

| | | | |
|---|---|---|---|
| WO | WO 94/19286 A1 | 9/1994 | |
| WO | WO 1994019286 A1 * | 9/1994 | |
| WO | WO 00/24680 A1 | 5/2000 | |
| WO | WO 2012/100264 A1 | 7/2012 | |
| WO | WO-2012100264 A1 * | 7/2012 | ............ C02F 1/5236 |
| WO | WO 2012/106765 A1 | 8/2012 | |
| WO | WO-2017024251 A * | 2/2017 | ............ A01N 25/22 |

OTHER PUBLICATIONS

International Search Report for PCT/IB2017/051659 dated Jun. 9, 2017.

* cited by examiner

*Primary Examiner* — Anthony J Zimmer
*Assistant Examiner* — Logan Edward Laclair
(74) *Attorney, Agent, or Firm* — Knobbe, Martens, Olson & Bear, LLP

(57) ABSTRACT

The invention provides a composition of particulate materials. The composition comprises lanthanum chloride in particulate form. The composition also comprises up to about 4% by weight of amorphous silica in particulate form, based on the combined weight of the lanthanum chloride and the amorphous silica. The addition of amorphous silica to desiccated lanthanum chloride forms a fine coating or barrier on the outer surfaces of the individual lanthanum crystals, providing a composition that is significantly more stable and able to resist coalescence of particles than pure desiccated lanthanum chloride.

15 Claims, No Drawings

COMPOSITIONS OF PARTICULATE MATERIALS

CROSS REFERENCE TO RELATED APPLICATIONS

This application is a U.S. National Phase Application of PCT International Application Number PCT/IB2017/051659, filed on Mar. 22, 2017, designating the United States of America and published in the English language, which is an International Application of and claims the benefit of priority to South African Patent Application No. 2016/01944, filed on Mar. 22, 2016. The disclosures of the above-referenced applications are hereby expressly incorporated by reference in their entireties.

FIELD OF THE INVENTION

THIS INVENTION relates to compositions of particulate materials, specifically compositions that are useful in water treatment. The invention provides a composition of particulate materials, specifically one that is useful in water treatment. The invention also provides packaged forms of the composition. The invention further provides a method of manufacturing a composition of particulate materials.

BACKGROUND TO THE INVENTION

LANTHANUM CHLORIDE is generally manufactured in particulate desiccated crystalline form, and is distributed in air-tight containers. Such an approach to its distribution is necessary, because of the hygroscopic nature of desiccated crystalline lanthanum chloride, taking into account that crystalline lanthanum chloride in its hydrated form can comprise in the order of about 55% water within its crystalline structure. In its desiccated form, crystalline lanthanum chloride is therefore highly hygroscopic.

When desiccated crystalline lanthanum chloride is exposed to humid surrounds, or in some cases to hydrated chemicals (e.g. with which it is co-blended or otherwise in contact with or exposed to), it becomes readily rehydrated. Often, such rehydration rapidly causes a phase change into a liquid, semi-liquid or paste-like state. While the lanthanum chloride would subsequently, when it is again desiccated (e.g. under more moderate conditions of temperature and humidity), revert to a solid form, particles thereof would have coalesced if the lanthanum chloride was previously in a particulate form (whether free-flowing or compacted). The Applicant has experienced that even when distributed in air-tight containers, particulate free flowing lanthanum chloride becomes coalesced into a single solid mass after only a few days, requiring it to be reprocessed into particulate form. This is obviously onerous and undesirable, not only when dealing with bulk quantities of lanthanum chloride, but also when dealing with processed forms of smaller quantities of lanthanum chloride.

Lanthanum chloride is particularly useful in water treatment. Water in general, but particularly stagnant water such as swimming pool water, is prone to sustain growth of algae when it is exposed to sunlight. Such growth is commonly regarded as undesirable, since it is unhygienic and not aesthetically pleasing. One method to remove algae from water involves neutralising the nutritional value of phosphate-based nutrients, which sustain the algae, by adding lanthanum chloride to the water. The lanthanum chloride reacts with the phosphate-based nutrients to form lanthanum phosphate complexes which are not nutritionally useful to algae.

It will be appreciated that the abovementioned physical properties of desiccated crystalline lanthanum chloride fundamentally limits the options available to formulators and marketers to exploit lanthanum chloride in a dry form, generally speaking, and in seeking to combine lanthanum chloride with other synergistic materials. As a result, lanthanum chloride is commonly commercially packaged and presented for sale in a pre-dissolved form. This, too, is undesired however. Pre-dissolution of lanthanum chloride in water obviously increases the volume of product that must be blended, packaged and distributed, resulting in increased packaging and transportation costs being passed to the consumer. This is exacerbated by the fact that, in the Applicant's experience, the most concentrated form in which pre-dissolved lanthanum chloride can practically be made available to the consumer is at about 620 g of lanthanum chloride salts per litre of water. However, in practice it is usually dissolved in concentrations of 110 to 250 g per litre, based on dosing considerations in swimming pool and industrial applications.

Regrettably, lanthanum phosphate complexes tend to render water milky or slightly opaque and therefore have to be removed from the water. This can be achieved by adding a suitable flocculant to the water that causes the complexes to precipitate, allowing for their removal from the water by filtration. It follows that water treatment with lanthanum chloride usually requires two treatment steps: (i) a first step in which the lanthanum chloride is added to the water and (ii) a second step in which the flocculant is added to the water. It is important that the second step is effected after the first step, observing a delay that is sufficient for the lanthanum chloride to contact and react with the phosphate-based nutrients in the water. Premature reaction between the lanthanum chloride and the flocculant would impede the required complexation. This method further increases the volume of lanthanum chloride based water treatment products, which often comprise a combination of the lanthanum chloride and the flocculant.

The present invention seeks to address at least some of the abovementioned challenges associated with exploitation of lanthanum chloride.

SUMMARY OF THE INVENTION

IN ACCORDANCE WITH ONE ASPECT OF THE INVENTION is provided a composition of particulate materials, the composition comprising a mixture of
 a lanthanide compound in particulate form; and
 up to about 4% by weight of amorphous silica in particulate form, based on the combined weight of the lanthanide compound and the amorphous silica.

The composition may, in particular, be a water treatment composition.

The lanthanide compound may be a compound of lanthanum. The compound of lanthanum may be lanthanum chloride. The lanthanum chloride may be a hydrate of lanthanum chloride, i.e. crystalline lanthanum chloride. Preferably, the hydrate of lanthanum chloride is selected from one and a combination of lanthanum chloride hexahydrate and lanthanum chloride heptahydrate. Lanthanum chloride hexahydrate is most preferred on the basis of formulation considerations, although lanthanum chloride heptahydrate has greater efficiency upon complexation in water treatment applications. Most preferably, the hydrate of lanthanum chloride is in a desiccated form thereof.

The composition may comprise at least about 85% by weight, or at least about 90% by weight, or at least about 95% by weight of the lanthanide compound.

The composition may comprise at least about 90% by weight, or at least about 95% by weight of the combined weight of the lanthanide compound and the silica. In one embodiment, the composition may therefore consist exclusively of the lanthanide compound and the silica.

The composition may comprise about 4% by weight of the amorphous silica based on the combined weight of the lanthanide compound and the amorphous silica. In another embodiment, the composition may comprise up to about 3% by weight, e.g. about 3% by weight, of the amorphous silica, based on the combined weight of the lanthanide compound and the amorphous silica. In another embodiment, the composition may comprise up to about 2% by weight, e.g. about 2% by weight, of the amorphous silica, based on the combined weight of the lanthanide compound and the amorphous silica. In another embodiment, the composition may comprise up to about 1% by weight, e.g. about 1% by weight or about 0.5% by weight, of the amorphous silica, based on the combined weight of the lanthanide compound and the amorphous silica.

The amorphous silica may be hydrophilic. Thus, the amorphous silica may be amorphous silica that has not been treated to render it, or that is otherwise, hydrophobic.

In one embodiment, the composition may be in the form of a loose, free-flowing mixture of the particulate materials.

When the composition is in the form of a loose, free-flowing mixture of the particulate materials, the composition may include a flocculating agent. The composition may comprise up to about 5% by weight of the flocculating agent. The flocculating agent may be one that is capable of causing flocculation of the lanthanide compound, and more specifically a lanthanide phosphate complex thereof, from a body of stagnant water in which the lanthanide compound has been dispersed. Such a flocculating agent may, for example, be aluminium sulphate, polyamine or polyacrylamide.

In another embodiment, the composition may be in the form of a compressed or compacted tablet of the particulate materials.

When the composition is in the form of a compressed or compacted tablet of the particulate materials, the composition may include a binding aid.

The binding aid may also be in particulate form, i.e. may comprise particulate material. In such a case, the binding aid may have an average particle size greater than that of the lanthanum chloride and that of the amorphous silica. For example, the amorphous silica may have an average particle size of about 2.5 micron, and the binding aid may have an average particle size in the range of about 2 to about 4 mm, e.g. about 3 mm.

The composition may comprise up to about 20%, e.g. about 20%, by weight of the binding aid. In another embodiment, the composition may comprise up to about 10% by weight, e.g. about 10% by weigh, about 8% by weight, or about 6% by weight, of the binding aid.

The binding aid may comprise an inert compound. In this sense, "inert" means that the inert compound is non-reactive with the lanthanide compound in water. The inert compound is preferably a salt, e.g. sodium chloride (NaCl).

The binding aid may also, or alternatively, comprise any one or more of a zeolite, carboxymethyl cellulose, bentonite clay, and aluminium sulphate.

When the composition is in the form of a compressed or compacted tablet, the composition may include a tableting lubricant. The composition may comprise up to about 2% by weight of the tableting lubricant. The tableting lubricant may, for example, be a stearate-based tableting lubricant.

When the composition is in its compressed or compacted form, it typically would not include a flocculant.

The composition preferably does not include any effervescing agents that render the composition effervescent.

THE INVENTION EXTENDS TO a packaged form of a composition of particulate materials, comprising the composition hereinbefore described in a loose, free-flowing form, inside a hermetically sealed sachet.

THE INVENTION ALSO EXTENDS TO a packaged form of a composition of particulate materials, comprising the composition hereinbefore described in the form of at least one compressed or compacted tablet, inside an air-tight container.

IN ACCORDANCE WITH ANOTHER ASPECT OF THE INVENTION IS PROVIDED a method of manufacturing a composition of particulate materials, the method including mixing
 a lanthanide compound in particulate form; and
 amorphous silica in particulate form such that the composition comprises up to about 4% by weight of the amorphous silica, based on the combined weight of the lanthanide compound and the amorphous silica.

The composition may be a composition as hereinbefore described.

The composition may be in a loose, free flowing form as hereinbefore described, or it may be in the form of a compacted or compressed tablet.

When the composition is in the form of a compacted or compressed tablet, the method may include forming the tablet by compacting or compressing a mixture of the particulate materials of the composition.

The method may include packaging the composition to provide the packaged forms of the composition, as hereinbefore described.

IN ACCORDANCE WITH A FURTHER ASPECT OF THE INVENTION IS PROVIDED a method of treating water, which includes adding to the water a composition of particulate materials as hereinbefore described.

EXAMPLES

THE INVENTION WILL NOW BE DESCRIBED IN MORE DETAIL with reference to some non-limiting examples thereof.

One embodiment of a composition of particulate materials according to the invention comprises a mixture of lanthanide compound, which is desiccated lanthanum chloride heptahydrate in particulate form obtained from Treibacher Industrie AG (Althofen, Austria), and amorphous silica, which is Syloid® 244 FP Silica obtained grace GRACE Materials Technologies (Columbia, Md., United States), also in particulate form. The composition does not include a flocculating agent.

In one form, the composition is provided as a free-flowing mixture. In this form, the composition, for example, comprises 98% by weight of the lanthanum chloride heptahydrate and 2% by weight of the Syloid®, based on the combined weight of the lanthanum chloride heptahydrate and the Syloid®.

In another form, the composition is a compressed or compacted tablet. In this form, the water treatment composition, for example, comprises a predetermined tableted quantity, e.g. 160 g, of one of (i) a first exemplary mixture that comprises
more than 90% by weight of a pre-mix of the lanthanum chloride heptahydrate and the Syloid® (the pre-mix comprising 98% by weight of the lanthanum chloride and 2% by weight of the Syloid ®),
between 1 and 2% by weight of a binder that comprises one or more of bentonite clay (kaolin), zeolite and aluminium sulphate,
up to 2% by weight NaCl, and
up to 2% by weight of a stearate tableting lubricant,
and (ii) a second exemplary mixture that comprises
more than 90% by weight of a pre-mix of the lanthanum chloride heptahydrate and the Syloid® (the pre-mix comprising 98% by weight of the lanthanum chloride and 2% by weight of the Syloid ®),
between 1 and 2% by weight of a first binder that comprises one or more of bentonite clay (kaolin), zeolite and aluminium sulphate,
up to 2% by weight of a second binder that is carboxymethyl cellulose (CMC),
up to 2% by weight NaCl, and
up to 2% by weight of a stearate tableting lubricant.

The first exemplary mixture is suitable for swimming pool applications, while the second exemplary mixture is suitable for industrial applications, both therefore providing water treatment compositions.

The NaCl may, for example, be medium or coarse grade of Mediterra® manufactured by Saltworks, Inc. of 106240 Wood-Red Road NE, Woodinville, WA 98072. Another option is Alberger® Coarse Topping Flake Salt manufactured by Cargill Salt, PO Box 5621, Minneapolis, Minn. 55440.

DISCUSSION

THE APPLICANT SURPRISINGLY FOUND that admixing amorphous silica with desiccated lanthanum chloride hexahydrate or heptahydrate, even in trace amounts, forms a fine coating or barrier on the outer surface of the individual lanthanum crystals, like an adsorbent, providing a composition that is significantly more stable than desiccated lanthanum chloride hexahydrate or heptahydrate on its own. This was evident from the fact that the Applicant observed a sample of such a composition of amorphous silica and desiccated lanthanum chloride hexahydrate or heptahydrate to remain in free-flowing form overnight, while a sample of pure lanthanum chloride hexahydrate or heptahydrate liquefied over the same period and under the same conditions. In similar samples stored in open containers for 6 months some minor coalescence of particles was ultimately observed but was limited only to the uppermost exposed surface of the sample. It was found that air-tight packaging of the composition completely avoids such coalescence, in comparison to an observation that air-tight packaging of a bulk volume of lanthanum chloride not containing amorphous silica did not avoid coalescence, since it solidified after a few days despite being air-tightly packaged.

The fact that the Applicant has provided a composition of lanthanum chloride hexahydrate or heptahydrate that remains substantially dry, free flowing and finely divided, allows the lanthanum chloride hexahydrate or heptahydrate to be dry-blended in a free-flowing form and, optionally, pressed into a tableted form. Packaged air-tightly, such compositions maintain their finely divided form, whether free-flowing or pressed. It will be appreciated that this obviates the requirement for pre-dissolution of lanthanum chloride and therefore also significantly reduces the volume of lanthanum chloride products. In addition, this formulation now makes it possible to commingle silica-coated lanthanum crystals with other non-desiccated chemicals in the future in order to potentially produce value-added, synergistic compositions.

The Applicant is aware that silica already finds application in water dissolvable/dispersible compositions. In the Applicant's experience, however, this application is limited to effervescent compositions in which silica acts only as a blending aid and dispersant. The Applicant is also aware that silica has been used as a primary binder in chlorine tablets. However, this particular instance differs from the Applicants invention in that the silica has been pre-treated to render it hydrophobic in nature. This is not the case in the present invention, in which it is desired of the silicate to be hydrophilic.

The invention claimed is:

1. A composition of particulate materials, comprising free-flowing particles of lanthanum chloride mixed with free-flowing particles of amorphous silica, the composition comprising up to 4% by weight of amorphous silica based on the combined weight of the lanthanum chloride and the amorphous silica.

2. The composition according to claim 1, wherein the lanthanum chloride is desiccated crystalline lanthanum chloride.

3. The composition according to claim 2, wherein the crystalline lanthanum chloride is lanthanum chloride hexahydrate or lanthanum chloride heptahydrate.

4. The composition according to claim 1, wherein said composition comprises at least 85% by weight of the lanthanum chloride.

5. The composition according to claim 1, wherein said composition comprises up to 3% by weight of the amorphous silica, based on the combined weight of the lanthanum chloride and the amorphous silica.

6. The composition according to claim 1, wherein the amorphous silica is hydrophilic.

7. The composition according to claim 1, wherein said composition consists of a loose, free-flowing mixture of the particulate materials.

8. The composition according to claim 7, wherein said composition further comprises up to 5% by weight of a flocculating agent.

9. The composition according to claim 1, wherein said composition is in the form of a compressed or compacted tablet.

10. The composition according to claim 9, wherein the particulate materials comprise particles of an inert compound that has an average particle size greater than that of the particles of the lanthanum chloride and that of the particles of the amorphous silica.

11. The composition according to claim 10, wherein the inert compound is sodium chloride.

12. The composition according to claim 10, wherein said composition comprises up to 20% by weight of the inert compound.

13. A packaged form of a composition of particulate materials, comprising the composition of claim 7 inside a hermetically sealed sachet.

14. A packaged form of a composition of particulate materials, comprising the composition of claim 9 inside an air-tight container.

15. A method of manufacturing a composition of particulate materials, the method comprising:
mixing particles of lanthanum chloride and particles of amorphous silica,
such that the composition comprises up to 4% by weight of the amorphous silica, based on the combined weight of the lanthanum chloride and the amorphous silica.

* * * * *